United States Patent [19]
Moulinet

[11] Patent Number: 5,222,912
[45] Date of Patent: Jun. 29, 1993

[54] AXIALLY FIXED TRANSMISSION JOINT

[75] Inventor: Francois Moulinet, Triel Sur Seine, France

[73] Assignee: Glaenzer Spicer, Poissy, France

[21] Appl. No.: 620,881

[22] Filed: Nov. 29, 1990

[30] Foreign Application Priority Data

Nov. 30, 1989 [FR] France .................. 89 15828

[51] Int. Cl.$^5$ ............................................ F16D 3/205
[52] U.S. Cl. .................................. 464/111; 464/133; 464/905; 277/212 FB
[58] Field of Search ............... 464/111, 133, 173, 905, 464/124, 906; 277/212 FB, 215

[56] References Cited

U.S. PATENT DOCUMENTS

| | | | |
|---|---|---|---|
| 3,287,934 | 11/1966 | Asher | 464/906 X |
| 3,296,834 | 1/1967 | Gravel | 464/906 X |
| 3,643,468 | 2/1972 | Kleinschmidt et al. | 464/124 |
| 3,707,852 | 1/1973 | Burckhardt et al. | 464/133 X |
| 4,507,100 | 3/1985 | Doré et al. | 464/111 |
| 4,778,026 | 10/1988 | Uchida et al. | 464/111 X |
| 4,946,303 | 8/1990 | Sawicki | 277/212 FB X |

FOREIGN PATENT DOCUMENTS

| | | |
|---|---|---|
| 1439507 | 4/1966 | France . |
| 2416811 | 9/1979 | France . |
| 591146 | 8/1947 | United Kingdom . |
| 874483 | 8/1961 | United Kingdom . |

*Primary Examiner*—Daniel P. Stodola
*Assistant Examiner*—William G. Battista, Jr.
*Attorney, Agent, or Firm*—Wenderoth, Lind & Ponack

[57] ABSTRACT

A transmission joint has a body connected to a first shaft which delimits a cavity. Inside the cavity is formed at least one pair of running tracks, in which is received a running element connected to a second shaft. The joint has an element for axially retaining the body relative to the second shaft, which element comprises an elastically deformable element which has the shape of a body of revolution, a high axial rigidity and two coaxial, cylindrical joining surfaces, an inner surface and an outer surface, which are connected to the second shaft and the body, respectively.

12 Claims, 2 Drawing Sheets

AXIALLY FIXED TRANSMISSION JOINT

BACKGROUND OF THE INVENTION

1. FIELD OF THE INVENTION

The present invention relates to a transmission joint of the type comprising a body connected to a first shaft and which delimits a cavity inside which is formed at least one pair of running tracks in which is received a running element connected to a second shaft.

(2.) State of the Prior Art

Numerous transmission joints of the above type are known, in particular constant-velocity joints, for which it is necessary to ensure that one shaft is virtually axially fixed relative to the other, while at the same time preserving the greatest amount of freedom of articulation for the transmission joints.

Numerous arrangements have been proposed, most of which consist in providing means for axial abutment in both directions, which means are independent of one another or grouped together in the same unit, which all have the common disadvantages of giving rise, as a result of their designs, to impact phenomena, which are detrimental to the satisfactory operation of the joint, generate undesirable noises and cause premature wear with the appearance of axial play.

SUMMARY OF THE INVENTION

The object of the present invention is to provide a transmission joint in which the means for axially retaining one shaft relative to the other never function as abutment means.

To this end, the invention provides a joint of the abovementioned type, characterized in that it has an element for axially retaining the body relative to the second shaft, which element comprises an elastically deformable element which has the shape of a body of revolution, a high axial rigidity and two coaxial cylindrical joining surfaces, an inner surface and an outer surface, which are connected to the second shaft and to the said body, respectively.

By virtue of this design, a transmission joint is obtained in which the elastically deformable element performs the function of an elastic (non-rotating) bearing with high axial rigidity.

According to other features of the invention: the inner joining surface is connected to the second shaft on the side of the running element axially opposite the end of the shaft which penetrates into the cavity;

the outer joining surface of the deformable element is connected in the vicinity of the free edge of the cavity;

the inner joining surface is mounted on a corresponding cylindrical bearing surface of the second shaft, relative to which it is axially immobilized;

the outer joining surface is mounted on a corresponding cylindrical part of the body;

the cylindrical bearing surface of the body is formed in a cover closing the cavity and which comprises a plane radial face bearing against a corresponding plane radial face of the body;

the plane radial face of the body is formed in the vicinity of the free edge of the body; and the elastically deformable element constitutes a leaktight partition for closing the cavity on one of its sides.

BRIEF DESCRIPTION OF THE DRAWINGS

Other features and advantages of the invention will emerge upon reading the detailed description below, for the comprehension of which reference should be made to the attached drawings, in which.

DETAILED DESCRIPTION OF THE PREFERRED EMBODIMENT

Figure 2:
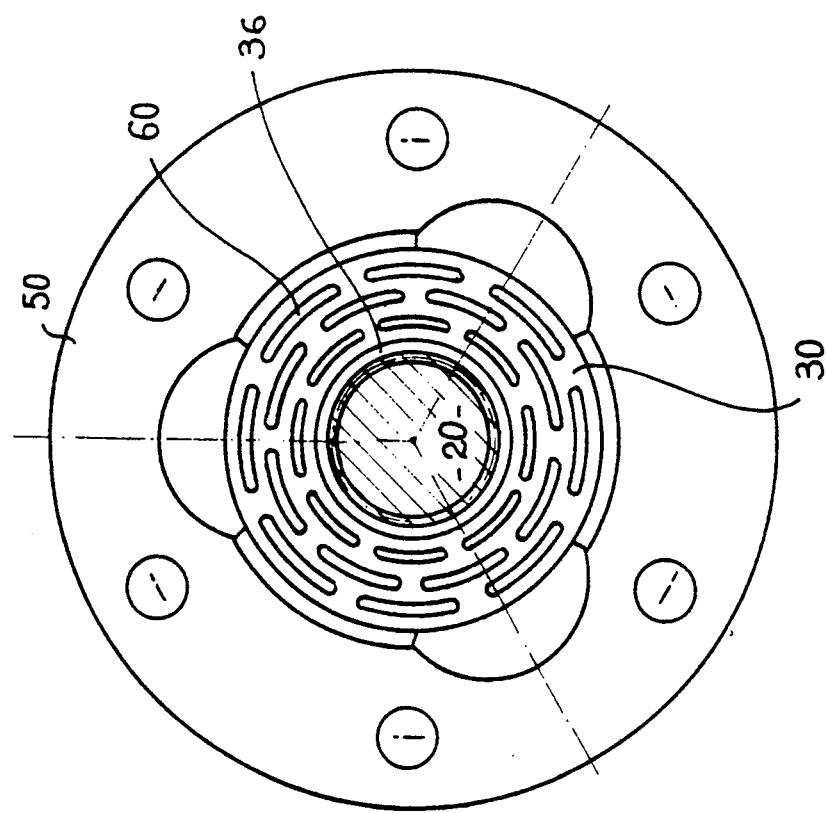
FIG. 2 is a view in section along the line 2—2 in FIG. 1.

A tripod constant-velocity transmission joint 10 has been shown in the figures, of the type comprising a body 12, also called a tulip, of a generally cylindrical shape, which delimits internally a cavity 14 in which a tripod 16 is received.

The body 12 is provided so as to be connected to a first shaft, not shown, the joint of which ensures the transmission link with a second shaft 18, on a splined end 20 of which is mounted the tripod 16.

The tripod comprises, in a known manner, three arms 22, on each of which is mounted a running element in the form of a spherical roller 24. Each spherical roller 24 is received running in a running channel formed in the body 12 which consists of two running tracks of complementary profiles 26.

In the position shown in the figures, in other words the so-called aligned position, the axis of the second shaft 18 and the axis of the cylindrical body 12 are aligned and coincide.

The joint according to the invention is a so-called axially fixed, or virtually axially fixed joint. In other words, the joint comprises means 28 provided in order to oppose any relative axial displacement of the two transmission shafts, and hence of the mid plane P of the tripod 16, relative to the body 12.

According to the invention, the axial-retention means 28 consists of an elastically deformable element 30.

The deformable element 30, which is for example made from rubber or an elastomeric material, is a member which delimits two coaxial cylindrical joining surfaces, an inner surface 32 and an outer surface 34, respectively.

The deformable element has a shape specific to the optimum functioning of the joint, such as for example the shape of a body of revolution. The inner cylindrical joining surface 32 is stuck, or adhesively bonded, to an inner annular ring 36.

The inner ring 36 of the deformable element 30 is mounted clamped on a cylindrical bearing surface 38 of the second shaft 18, between a radial shoulder 40 of the latter and a lateral radial face facing the central body of the tripod 16.

The inner cylindrical joining surface is thus connected to the second shaft 18 on the side of the running elements 24 which is axially opposite the free end 20 of the second shaft 18, which end is arranged in the cavity 14 opposite the bottom 44 of the latter.

Figure 1:
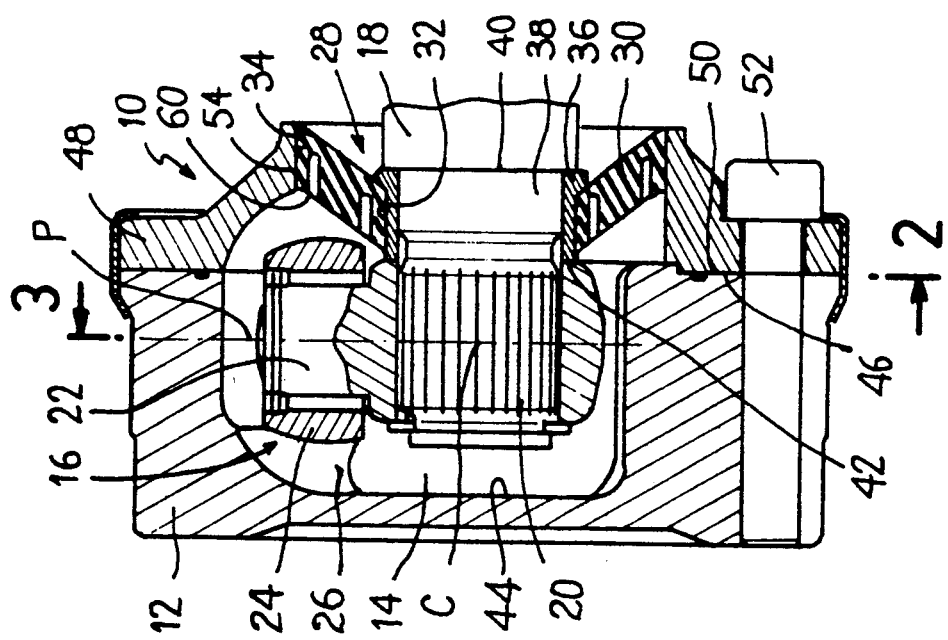
FIG. 1 is a view in axial section of a transmission joint constructed according to the teachings of the present invention.
Figure 3:
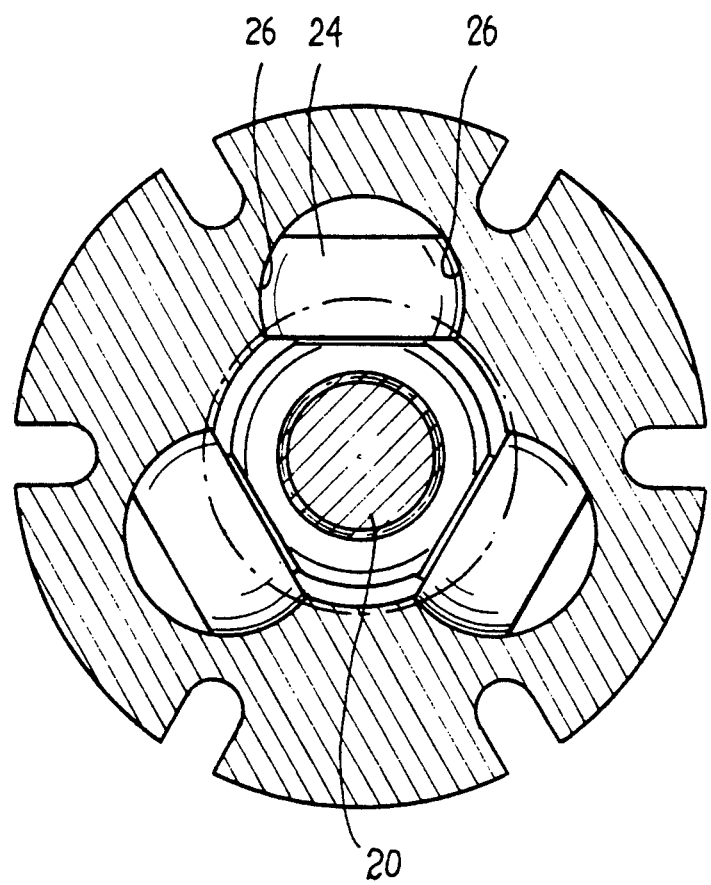
FIG. 3 is a view in partial section along the line 3—3 in FIG. 1.

The cylindrical body 12 terminates axially, on the right-hand side of FIG. 1, in a radial plane end face 46.

The outer cylindrical joining surface 34 of the deformable element 30 is connected to the body 12 in the vicinity of its end face 46 by means of a cover 48 for closing the body 12.

The cover 48 is a body of revolution which bears axially against the radial face 46 of the body 12 by way of a corresponding plane radial face 50, the axial clamping of the two pieces 12 and 48 being ensured, for example, by means of a series of six screws 52.

The cover 48 comprises a coaxial cylindrical surface 54 which is the bearing surface to which the outer joining surface 34 of the elastically deformable element 30 is stuck or adhesively bonded.

The bearing surface 54 thus extends, in the aligned position, coaxially of the inner bearing surface 38 formed on the second shaft 18, being slightly offset axially to the right relative to the bearing surface 38.

According to the preferred embodiment shown in the figures, the elastically deformable element 30 is a solid element; in other words, it constitutes a leaktight partition for closing the cavity 14 on the side of the cavity opposite the bottom 44. This feature is particularly advantageous since it permits the element 30 to fulfill simultaneously the twin functions of axial retention and of sealing the cavity 14, which is filled with grease for lubricating the constant-velocity joint.

As can be seen in FIGS. 1 and 2, the deformable element 30 comprises, on its radial face turned towards the inside of the cavity 14, a series of axial blind recesses 60, the purpose of which is to give it a high degree of flexibility or elasticity in other directions, so as not to oppose the transmission joint assuming an angled position.

As can be seen from the figures, the deformable element 30 is substantially shaped in a cone.

In axial section, the element 30 has a distortion or curve turned towards the inside of the cavity 14 which participates in the very high axial rigidity of the assembly in the direction corresponding to the two transmission shafts moving apart from each other.

By virtue of the design according to the invention, it is possible to design and conceive the elastically deformable element 30 such that its temporary center of rotation always coincides with the geometrical center C of the constant-velocity joint, irrespective of the angle at which the latter is functioning.

The invention is not, of course, limited to the embodiment of the elastically deformable element which has just been described, or to its modes of connection to the second shaft 18 and to the body 12.

Given the fact that the object of the deformable element 30 is to perform a function equivalent to that of a non-rotating elastic bearing with high axial rigidity, but with high flexibility in the other directions of deformation, all the designs enabling these two functions to be realised simultaneously fall within the scope of the present invention.

The invention is not, of course, limited to a constant-velocity joint with rollers, but applies equally, for example, to joints with balls.

The invention also relates to fixed or virtually fixed constant-velocity joints used, in particular, in rear lateral transmissions, or longitudinal transmissions arranged between the engine-gearbox unit and the rear axle or a box transferring power to the latter.

Similarly, it is possible to give the elastically deformable element mounted between the shaft 18 and the body 12 an elasticity in rotation about its axis of revolution which permits the angular play existing between the tripod 16 and the body 12 to be taken up automatically so as to avoid noises when starting up.

Similarly, the outer cylindrical surface of the element 30 can be connected directly to a cylindrical bearing surface formed in the body 12 and not in the attached cover 48.

The invention is to be applied very particularly to so-called joints "with great axial freedom", in other words those joints for which, when functioning at an angle, the axial stresses of the driving element relative to the driven element are relatively low. A tripod constant-velocity joint is an example of these joints.

I claim:

1. A transmission joint comprising:
   a joint body connected to a first shaft, said joint body defining a cavity having there inside at least one pair of running tracks;
   a running element connected to a second shaft, said running element being received in said at least one pair of running tracks; and an elastically deformable element having an annular shape, high axial rigidity and inner and outer coaxial cylindrical joining surfaces connected to said second shaft and said joint body, respectively, said elastically deformable element defining axial retaining means for axially retaining said joint body relative to said second shaft such that the position of said first shaft relative to said second shaft in the axial direction is substantially fixed and constant.

2. The transmission joint of claim 1, wherein said second shaft has one end thereof extending into said cavity with said running element thereon, said inner joining surface connecting to said second shaft at a point axially on the other side of said running element from said one end.

3. The transmission joint of claim 2, wherein said cavity in said joint body has a free edge, and said outer joining surface is connected to said joint body at said free edge of said cavity.

4. The transmission joint of claim 2, wherein said second shaft has a cylindrical bearing surface to which said inner joining surface is mounted and relative to which said inner joining surface is axially immobilized.

5. The transmission joint of claim 1, wherein said cavity in said joint body has a free edge, and said outer joining surface is connected to said joint body at said free edge of said cavity.

6. The transmission joint of claim 1, wherein said second shaft has a cylindrical bearing surface to which said inner joining surface is mounted and relative to which said inner joining surface is axially immobilized.

7. The transmission joint of claim 1, wherein said joint body has a cylindrical bearing surface to which said outer joining surface is mounted.

8. The transmission joint of claim 7, wherein said joint body has a cover closing said cavity, said cavity and said cover having plane radial faces bearing against each other, and said cover having said cylindrical bearing surface thereon.

9. The transmission joint of claim 1, wherein said elastically deformable element is leakproof and said cavity is fluidly sealed thereby.

10. The transmission joint of claim 1, wherein said elastically deformable element is substantially shaped as a cone, with said inner and and outer joining surfaces at opposite ends thereof.

11. The transmission joint of claim 10, wherein said elastically deformable element has a plurality of axial recesses therein or providing flexibility in directions other than the axial direction.

12. The transmission joint of claim 1, wherein said elastically deformable element has a plurality of axial recesses therein for providing flexibility in directions other than the axial direction.

* * * * *